(12) United States Patent
Rahman et al.

(10) Patent No.: US 7,436,919 B2
(45) Date of Patent: Oct. 14, 2008

(54) METHODS AND APPARATUS FOR BIT SYNCHRONIZING DATA TRANSFERRED ACROSS A MULTI-PIN ASYNCHRONOUS SERIAL INTERFACE

(75) Inventors: Mahibur Rahman, Lake Worth, FL (US); Emilio J. Quiroga, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 558 days.

(21) Appl. No.: 11/097,577

(22) Filed: Apr. 1, 2005

(65) Prior Publication Data

US 2006/0222136 A1 Oct. 5, 2006

(51) Int. Cl.
    *H04L 7/00* (2006.01)
(52) U.S. Cl. ............... 375/371; 375/374; 375/375; 375/355; 375/354; 327/24; 327/23; 327/33; 327/141; 327/151
(58) Field of Classification Search ............ 375/371, 375/374, 375, 355, 354
    See application file for complete search history.

(56) References Cited

U.S. PATENT DOCUMENTS

| | | | |
|---|---|---|---|
| 3,792,476 A * | 2/1974 | Domer | 342/88 |
| 5,081,654 A * | 1/1992 | Stephenson et al. | 375/368 |
| 5,349,611 A | 9/1994 | Varian | |
| 5,920,600 A * | 7/1999 | Yamaoka et al. | 375/376 |
| 6,795,514 B2 * | 9/2004 | Gresham | 375/354 |
| 6,819,728 B2 | 11/2004 | Boerstler | |
| 6,915,462 B1 * | 7/2005 | Davis et al. | 714/700 |
| 6,937,683 B1 * | 8/2005 | Ratzel | 375/376 |
| 6,970,521 B2 * | 11/2005 | Dosho | 375/340 |
| 2003/0043926 A1 * | 3/2003 | Terashima et al. | 375/257 |
| 2003/0091136 A1 * | 5/2003 | Sugita | 375/355 |
| 2004/0105515 A1 * | 6/2004 | Mo et al. | 375/354 |
| 2004/0141577 A1 | 7/2004 | Brunn et al. | |
| 2004/0148539 A1 | 7/2004 | Leydier et al. | |
| 2004/0264613 A1 * | 12/2004 | Buchmann | 375/354 |
| 2004/0264614 A1 * | 12/2004 | Tinker | 375/355 |

OTHER PUBLICATIONS

International Search Report from corresponding PCT Application No. PCT/US06/10744 dated Sep. 4, 2007.

* cited by examiner

*Primary Examiner*—Chieh M. Fan
*Assistant Examiner*—Siu M Lee
(74) *Attorney, Agent, or Firm*—Ingrassia Fisher & Lorenz, P.C.

(57) ABSTRACT

Methods, devices and systems are provided for bit synchronizing multiple serial bitstreams (106) with a common clock signal (116). Activity occurring in each bitstream is detected (304) for each of a plurality of phases corresponding to cycles of the common clock signal. One of the plurality of phases is selected (308) for each of the serial bitstreams based upon the activity detected within the selected phase. Data is then extracted (322) from the selected phase for each of the serial bitstreams using the common clock signal to thereby bit synchronize each of the plurality of serial bitstreams to each other.

18 Claims, 3 Drawing Sheets

METHODS AND APPARATUS FOR BIT SYNCHRONIZING DATA TRANSFERRED ACROSS A MULTI-PIN ASYNCHRONOUS SERIAL INTERFACE

TECHNICAL FIELD

The present invention generally relates to bit synchronization, and more particularly relates to methods and apparatus for bit synchronizing bitstreams received across a multi-pin asynchronous interface.

BACKGROUND

Electrical and electronic communications continue to permeate every aspect of modem life. Computer systems, for example, are becoming increasingly mobile and inter networked, portable telephones are becoming more ubiquitous, and consumers continue to demand constant access to streaming video, audio, data and other services. As the demand for such services continues to escalate, a need arises for data communications schemes that are space efficient, yet provide rapid data throughput.

Most conventional data signaling schemes used for digital data can be generally classified as "serial" (i.e. providing a stream of sequential data bits across a single channel) or "parallel" (i.e. providing separate streams of data bits across two or more data channels). Serial schemes have the general advantage of being less complicated and more space efficient than parallel schemes due to the single data channel. In particular, the single serial data channel typically uses a minimal number of "pins" on a microchip or similar module. Multiple data paths present in a parallel data channel can consume additional pins and other chip resources, but are generally capable of providing more data at a given transfer rate than a corresponding serial channel. Stated another way, although the serial channels are generally efficient in terms of space and physical overhead, the data rate for a serial channel must typically be faster than that applied to each of the multiple parallel channels for the serial scheme to transfer an equivalent amount of data. While serial transfer schemes are therefore beneficial for many applications (e.g. when space is limited or pin count is a consideration), the bit transfer rates used to obtain acceptable throughput over a serial channel can be significant.

Further, practical serial transfer rates can be hampered by limited availability of high-speed clock sources, speed limitations of transmitting and receiving devices, and/or other factors. As a result, many data signaling schemes now subdivide data messages into distinct "words" that can be simultaneously transmitted across multiple serial data channels. Such a hybrid scheme offers the advantage of reduced pin count compared to traditional parallel schemes along with lower bit rates typically associated with traditional serial schemes without sacrificing total throughput. Difficulties can arise, however, in reconstructing the original message from the collection of independently-recovered serial data words. These difficulties can result from varying path delays (skew) exhibited by the multiple serial channels, which in turn can result from variations in supply voltage, variations in temperature and other environmental effects, and other factors.

Accordingly, it is desirable to formulate a technique for re-synchronizing the multiple serial bitstreams transferred in a multi-pin asynchronous data interface. In addition, it is desirable to create devices and systems for re-synchronizing the serial bitstreams. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The various serial bit streams received in a multi-pin asynchronous serial interface are suitably bit synchronized within independent bit synchronization modules each associated with one of the serial channels to generate recovered serial data. In various embodiments, the bit synchronization feature is accomplished by oversampling the received bit stream at an integer multiple (N) of the bit stream data rate to create multiple phases associated with each bit period. Bit transitions occurring during each phase are detected, and one of the phases having a relatively low number of bit transitions during the most-recent bit periods is selected. The selected phase of the bit stream is then extracted as the serial output signal. The selected phase may monitored and updated throughout operation to continually provide an accurate output data stream. Further, a delay may be provided at the output to compensate for timing changes resulting from changes in the selected phase. As a result, the various serial bit streams received in the multi-pin serial interface can be converted to synchronized data streams based upon a common clock signal at a fixed data rate.

According to various further embodiments, the bit synchronized serial data streams are further processed by a word synchronization unit to generate word-aligned parallel output data. In such embodiments, the word synchronization function can be greatly simplified due to the fixed data rate of the synchronized output streams received from the bit synchronization units. The data words originally transmitted across the multi-pin serial interface can be subsequently re-assembled or otherwise processed in any appropriate manner. Moreover, certain embodiments may be implemented with robust digital circuitry, thereby reducing or eliminating the need for less robust analog components such as an analog charge pumps, voltage controlled oscillators (VCO) or the like. The concepts set forth herein may be useful in any communications interface applications (e.g. any interface between radio frequency (RF) and baseband transceivers, or the like) and may be readily implemented with complementary metal oxide semiconductor (CMOS) or other integrated circuitry techniques, although other embodiments may be implemented with other forms of integrated circuitry, discrete logic, software and/or any combination of hardware and software components.

Figure 1:
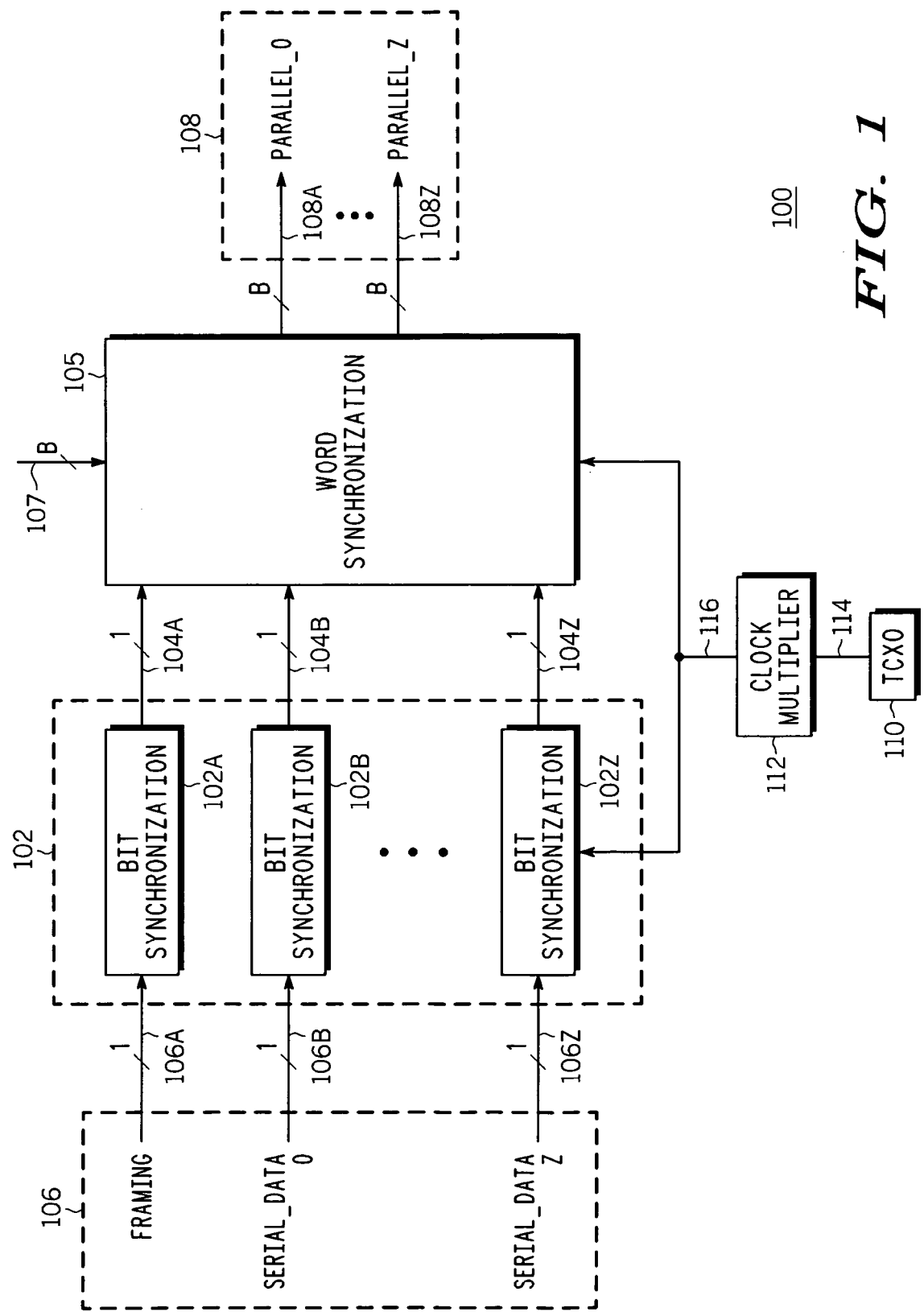
FIG. 1 is a block diagram of an exemplary system for synchronizing multiple serial bitstreams.

Turning now to the drawing figures and with initial reference to FIG. 1, an exemplary embodiment of a system 100 for synchronizing any number of serial bitstreams 106A-Z received at a multi-pin asynchronous interface 106 suitably includes a bit synchronization module 102A-Z for each serial bitstream 106A-Z, as well as a word synchronization module 105. Each bit synchronization module 102A-Z receives one of the serial bitstreams 106A-Z received at interface 106 and recovers a serial data stream 104A-Z at a fixed data rate. Word synchronization module 105 receives each of the synchronized bit streams 104A-Z and produces one or more output streams 108 as appropriate. Output streams 108 may variously include any number of parallel data streams 108A-Z and/or the like.

In various embodiments, each bit synchronization module 102A-Z and word synchronization module 106 receive a clock signal 1.16 with a frequency that substantially corresponds to an integer multiple (N) of the data rate for the incoming serial data streams 106A-Z. "Substantially" in this context is intended to acknowledge that some variation may exist due to manufacturing, design and implementation imperfections, as well as environmental variation and other factors. As a result, the frequency of signal 116 need not exactly match an integer multiple of the data rate to substantially incorporate the concepts conveyed herein. Clock signal 116 may be produced from any clock generation circuitry or logic in any convenient manner, such as using any crystal, oscillator, phase locked loop (PLL) or other clock source 110, and/or by multiplying or otherwise processing any signal 114 received from a clock source 110 using appropriate logic 116.

Bit synchronization modules 102A-Z are implemented with any integrated, discrete, software, firmware and/or other logic capable of producing a serial data stream 104 at a desired data rate. According to various exemplary embodiments, each bit synchronization module 102A-Z oversamples the associated incoming bit stream 106A-Z using clock signal 116. Because clock signal 116 suitably corresponds to an integer multiple (N) of the bit rate for the incoming stream 106A-Z, the oversampling using clock signal 116 effectively separates each incoming bit period into N distinct phases in which activity can be detected. By identifying bit transitions (e.g. low-to-high or high-to-low state changes) occurring within each phase, one of the phases can be selected based upon the level of activity occurring within that phase. That is, a phase that is likely to have an accurate data value (as compared to the other phases) can be readily identified by monitoring activity occurring within each phase. Although the particular selection algorithms may vary from embodiment to embodiment, the sampling phase can be selected based upon lack of bit transitions occurring within an appropriate number of prior bit periods. Alternatively, the sampling phase may be selected based upon the minimal activity occurring during a particular phase, or any other appropriate technique. Data can then be extracted from the selected phase to produce an accurate representation of the input data stream. The selected phase can be extracted, for example, from the appropriate tap of an N-tap delay line or similar structure. Moreover, an additional delay can be applied in response to the selected phase to ensure that the output serial data stream 104A-Z is provided to word synchronization module 105 at a constant data rate. By continuously oversampling and analyzing each phase of the incoming data stream 106A-Z, serial data can be identified and extracted in an efficient and consistent manner to ensure correct phasing and a relatively constant output data rate.

Word synchronization module 105 is any logic, circuit or other module capable of receiving the bit-synchronized data streams 104A-Z and producing output streams 108A-Z in response thereto. In various embodiments, word synchronization module 105 recovers parallel words 108A-Z from the bit-synchronized serial streams 104A-Z by correlating each of the received serial streams 104A-Z to a known synchronization word 107 that is received during an initial training period. During subsequent operation, the known correlation between the synchronization word 107 and each stream 104A-Z can be used to identify data word boundaries. Various embodiments further identify framing information about words transferred across interface 106 by dedicating one or more serial channels (e.g. channel 106A in FIG. 1) to transmitting framing information. Such information may include, for example, an identification of the most or least significant bit of data words transmitted upon the other serial lines 106B-Z. Other embodiments may employ widely varying word synchronization schemes, or may omit word synchronization entirely.

In operation, then, each serial bitstream 106A-Z is received at a bit synchronization module 102A-Z that oversamples the received data, selects an appropriate phase for extracting data, and provides an extracted serial bit stream to word synchronization module 105 at a common data rate. Word synchronization module 105 then assembles parallel data words 108A-Z from the bit-synchronized data streams 104A-Z as appropriate.

Figure 2:
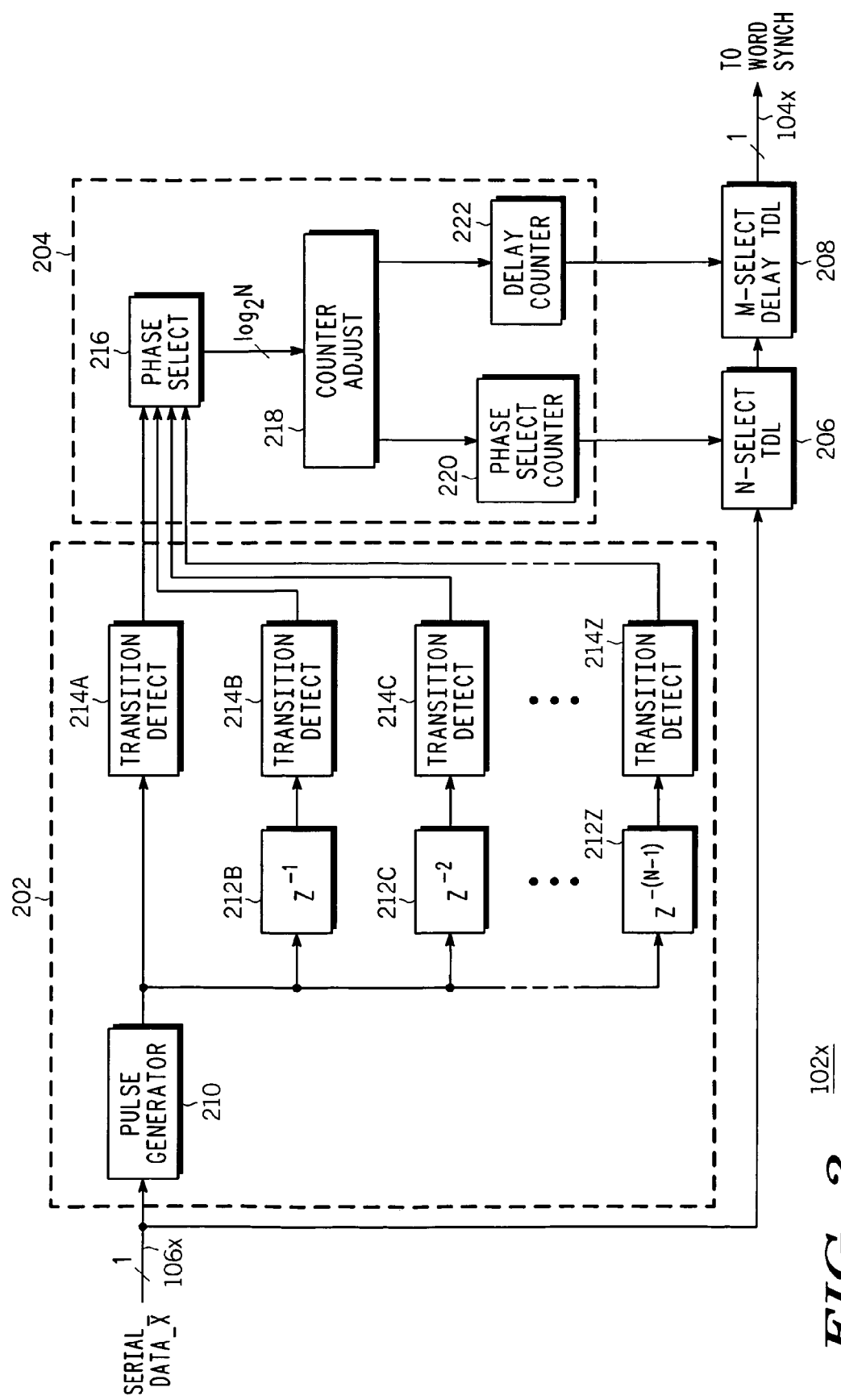
FIG. 2 is a block logic diagram of an exemplary bit synchronization module.

Data and framing signals 106A-Z are bit synchronized in any appropriate manner. Turning now to FIG. 2, an exemplary bit synchronization module 102x (representing any of the bit synchronization modules 102AZ in FIG. 1) suitably includes an activity detection module 202, a phase selection module 204 and a data extraction module 206. Bit synchronization module 102x may also include delay module 208 as appropriate. Each module 202, 204, 206 is implemented with any integrated, discrete, software and/or firmware constructs capable of performing the features described herein. Although rot expressly shown in FIG. 2, some or all of the processing modules 202, 204, 206, 208 receive common clock signal 116 (FIG. 1) to provide oversampling and synchronization of input streams 106A-Z.

Activity detection module 202 is any logic capable of detecting bit transitions in received serial data 106. Bit transitions may include low-to-high and/or high-to-low transitions, for example, and may be detected in any manner. As shown in FIG. 2, an exemplary embodiment of activity detection module 202 suitably includes a pulse generator 210 and any number of parallel channels each corresponding to one of the "N" phases of the oversampled bit period. Each channel suitably includes a transition detector 214A-Z and an appropriate delay 212B-Z to identify pulses occurring within each phase of the bit period. Pulse generator 210 produces a pulse or other suitable signal in response to a bit transition observed in signal data 106x. The signal produced by pulse generator 210 is then observed by one of the detector modules 214A-Z corresponding to the phase in which the signal was produced. In further embodiments, detector modules 214A-Z detect if any transitions occurred (e.g. if any pulses/signals are received from generator 210) during an appropriate number (P) of prior bit periods, where P is any positive integer. In such embodiments, each detector module 214A-Z effectively determines whether any activity occurred during a phase of interest during the previous P bit periods. Detector modules 214A-Z provide appropriate digital signals or other indicators to phase selection module 204 in response to activity detected within each phase;

Phase selection module 204 is any circuit, logic or other module capable of identifying one of the N oversampled phases of input data 106x that is suitable for extracting of synchronized serial data. In various embodiments, phase selection module 204 includes logic 216 that selects the appropriate phase based upon activity occurring within that phase. This selection may be made according to any algorithm or criteria. For example, the phase having the fewest number of bit transitions over an appropriate number of prior bit periods may be selected. Alternatively, the selected phase could be chosen to be a phase that precedes or follows another phase in which one or more bit transitions have occurred. Any techniques that identify one or more phases suitable for capturing data could be used in a wide array of alternate embodiments.

Various embodiments of selection module 204 further identify the selected phase by adjusting one or more counters 220, 222 that control switching and/or data extraction taps within extraction and/or delay modules 206, 208. Counter adjust logic 218, for example, receives an indication of the selected phase from phase selection logic 216 as appropriate. In various embodiments, the indication is provided over one or more signal lines interconnecting logic 216 and logic 218. In such embodiments, the number of parallel signal lines used to represent the selected state may equal or exceed the base-2 logarithm of the clock multiplier (i.e. $\log_2 N$) as appropriate. Alternatively, the selected phase may be represented as a digital value stored in a memory, register or similar construct, and/or represented in any other manner. Counter logic 218 adjusts counters 220, 222 as appropriate to extract the selected state from input stream 106x. Logic 218 may increment and/or decrement counters 220, 222, for example, to identify appropriate taps on extraction module 206 and/or delay module 208 to extract data from the selected phase and/or to compensate for timing, respectively. Additional detail regarding counter adjust logic 218 and counters 220 and 222 is provided below.

Extraction module 206 is any circuit, logic or other module capable of capturing a data value from the selected phase of input stream 106x. In various embodiments, extraction module 206 is a tapped delay line or similar structure that includes a suitable number of data "taps" for extracting data. In various embodiments, extraction module 206 includes at least N data taps, with each tap separated from a subsequent tap by a buffer or similar delay element to provide appropriate time domain separation between phases. Input stream 106x is provided to extraction module 206, which captures the selected phase using control signals received from phase selection module 204.

In various embodiments, a subsequent delay module 208 receives the extracted data signal and provides an appropriate time domain delay to compensate for the phase selection in extraction module 204. That is, as the phase selection delay is reduced in extraction module 206, an additional delay is provided by delay module 208 to ensure that the timing and phasing of output signal 104 remain relatively constant. Delay module 208 may be implemented with a tapped delay line similar to that used in extraction module 206. In various embodiments, delay module 208 includes more data taps than extraction module 206, however, to provide precise compensation for phase adjustment timing.

The resulting serial bit stream 104x output from bit synchronization module 102 may therefore be appropriately clocked to the reference clock signal 116, extracted from a reliable phase of input stream 106x, and adjusted for consistent phase synchrony. The synchronized bit stream 104x may be provided to word synchronization module 105 (FIG. 1) or otherwise processed as appropriate.

Figure 3:
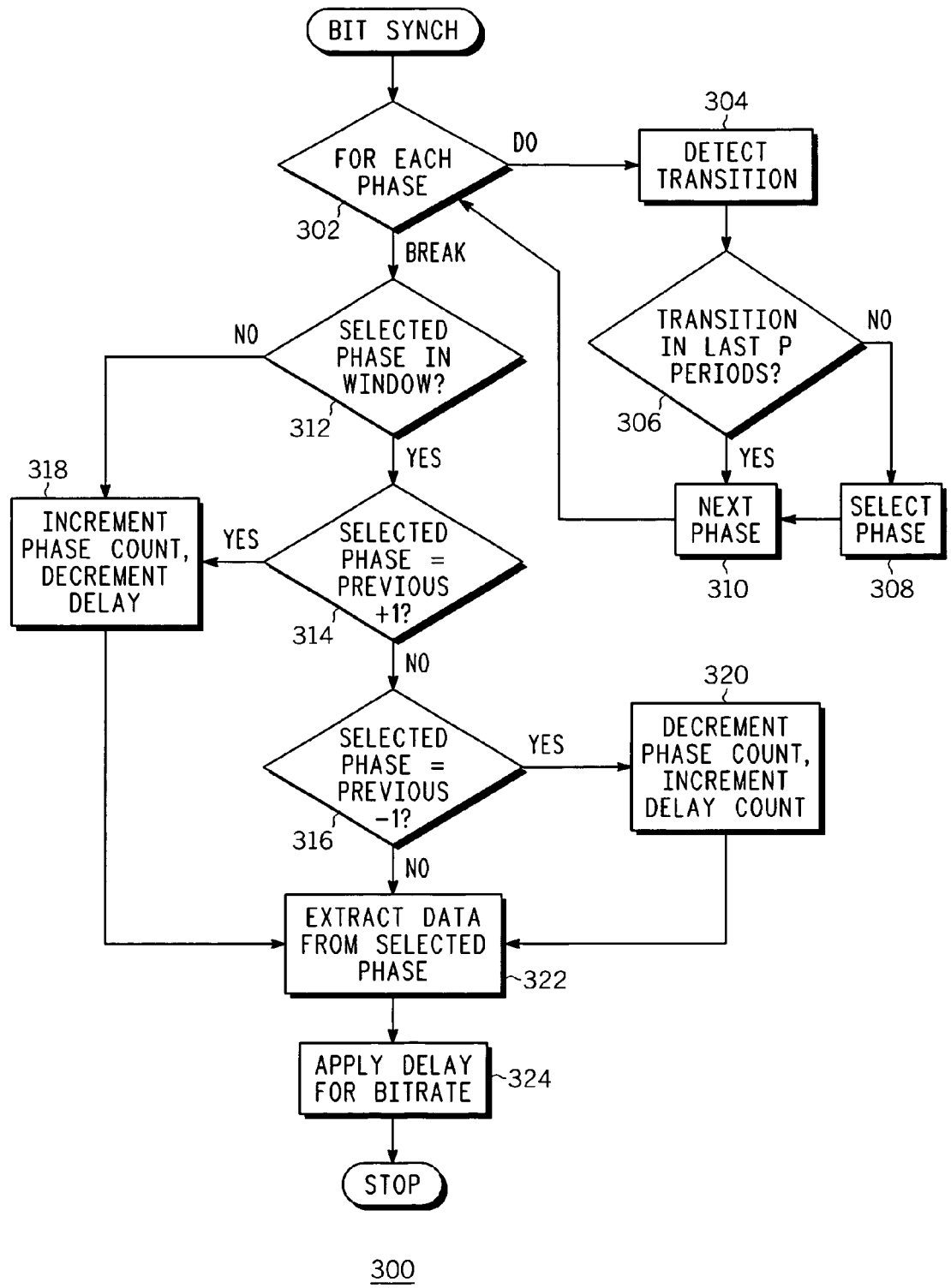
FIG. 3 is a flowchart of an exemplary process for bit synchronizing serial bitstreams.

With reference now to FIG. 3, an exemplary process 300 for bit synchronizing a serial bitstream to other bitstreams received on a common asynchronous interface suitably includes the broad steps of detecting activity occurring within each phase of the serial bitstream (step 304), selecting one of the phases (step 308) based upon the activity detected, and extracting data from the selected phase (step 322). Although FIG. 3 shows an exemplary process 300 for phase selection and extraction using phase and delay counters (elements 220, 222 in FIG. 2), equivalent embodiments may incorporate widely varying structures and processes. The flowchart in FIG. 3 is therefore intended as a logical representation of one exemplary process for extracting data from a selected phase of an input bitstream that may be supplemented or otherwise modified in any manner.

As described above, process 300 suitably begins by evaluating each phase of the input bitstream 106 to identify bit transitions or other activity occurring within that phase (step 302). Each of the phases suitably corresponds to a cycle of common clock signal 116 (FIG. 1), thereby creating an appropriate number of phases depending upon the ratio of the frequency of signal 116 to the bit rate of input bit stream 106.

Activity occurring within each phase may be detected in any manner (step 304), such as the pulse generation and detection scheme described in FIG. 2. The selected phase is then determined according to any suitable technique. In the exemplary embodiment shown in FIG. 3, transitions occurring within each phase are monitored over an appropriate number (P) of prior bit periods (step 306), with the active phase being selected if no bit transitions are identified during that time (step 308). If one or more transitions are identified during the prior bit periods, the subsequent phase is evaluated (step 310). In equivalent embodiments, however, the selected phase may be determined by identifying a phase with one or more transitions and then selecting the phase preceding or succeeding the transitional phase. The selected phase could alternately be determined as the phase having a minimal number of bit transitions occurring within the prior bit periods, and/or according to any other technique based upon the level activity occurring within the various phases of input bit stream 106.

FIG. 3 shows that the selected phase may be further processed to select appropriate data taps on extraction and delay modules 206, 208. In the embodiment shown in FIG. 3, the selected phase is initialized to any appropriate value (e.g. a middle phase), with subsequent iterations of steps 302-310 used to update the previously selected phase. In steps 312-320, counters 220, 222 (FIG. 2) are incremented and/or decremented as appropriate to obtain data from the selected phase at extraction module 206 and to provide a corresponding delay at module 208. Accordingly, increases in phase count typically correspond to decreases in delay count, and vice versa. The exemplary process 300 shown in FIG. 3 increments the phase count (step 318) if the selected phase is outside of a one-phase "window" of the previously selected phase (step 312) or if the selected phase is one phase in advance of the previously selected phase (step 314). Alternate embodiments may instead decrement the phase count when the selected phase is outside the "window", or may eliminate the window concept entirely. Process 300 similarly decrements the phase counter (step 320) when the selected phase prior to the previously selected phase (step 316). The values placed within counters 220, 222 may then be used to extract data from the selected data taps of extraction module 206 (step 322) and/or delay module 208 (step 324) as appropriate. Again, any phase selection/determination scheme may be used in a wide array of alternate embodiments.

Accordingly, a bit synchronization technique suitable for use with multi-pin asynchronous interfaces suitably provides phase synchrony between serial bit streams while accurately extracting data from each phase. Moreover, various implementations of the concepts described herein may be readily implemented using conventional digital circuitry, thereby reducing or eliminating the need for analog charge pump or voltage controlled oscillator (VCO) circuitry, which can be cumbersome to implement. Further, phase synchronized serial bitstreams can greatly simplify the circuitry used in various embodiments of word synchronization module 105.

Various exemplary embodiments include the following:

In one embodiment, a method for bit synchronizing a plurality of serial bitstreams with a common clock signal suitably comprises the steps of: detecting activity occurring within each of a plurality of phases for each of the serial bitstreams, wherein each of the plurality of phases corresponds to a cycle of the common clock signal; selecting one of the plurality of phases for each of the serial bitstreams based upon the activity detected within the selected phase; and extracting data from the selected phase for each of the serial bitstreams to thereby bit synchronize each of the plurality of serial bitstreams. In various embodiments, the activity is a bit transition. Further, the detecting step may comprise producing an indication signal in response to a bit transition occurring within one of the plurality of phases and subsequently detecting the occurrence of the indication signal during each of the plurality of phases and/or the like. The selecting step may comprise determining which of the plurality of phases exhibits the least amount of activity, and/or determining which of the plurality of phases exhibited bit transitions within a predetermined number of prior bit periods, and/or adjusting a phase select counter, and/or any other steps or sub-steps as appropriate.

Some methods may include the step of delaying the extracted data by a delay time determined as a function of the selected phase. In such embodiments, the selecting step may comprise adjusting a delay counter in response to the selected phase, wherein the delay counter is configured to alter the delay time.

Some methods may further comprise the step of generating the common clock signal as a function of a bitrate associated with each of the plurality of serial bitstreams. In such embodiments, the common clock signal may be substantially equal to an integer multiple of the bitrate.

Other embodiments include a device for synchronizing one of a plurality of serial bitstreams to the other bitstreams received in a multi-pin asynchronous interface having a common clock signal. The device suitably comprises: an activity detection module configured to detect bit transitions occurring during each of a plurality of phases of the bitstream, each phase corresponding to a cycle of the common clock signal; a phase selection module coupled to the activity detection module and configured to select one of the plurality of phases based upon the bit transitions detected within each of the plurality of phases; and a data extraction module coupled to the phase selection module, wherein the data extraction module is configured to extract the selected phase of the bitstream to thereby bit synchronize the bitstream to the other serial bitstreams. The activity detection module may comprise a pulse generator configured to generate a pulse in response to a bit transition in the bitstream, and/or a delay module and a transition detect circuit for each of the plurality of phases. The phase selection module may comprise phase selection logic configured to identify the selected phase based upon the number of bit transitions occurring within a predetermined number of prior bit periods. The data extraction module may comprise a tapped delay line having a plurality of taps each associated with one of the plurality of phases, and may further comprise a phase select counter and counter adjustment logic configured to increment and/or decrement the phase select counter to thereby select one of the plurality of taps corresponding to the selected phase with the phase select counter.

The device may also include a delay module coupled to receive the selected phase of the bitstream from the phase extraction module and to apply a delay to the selected phase. In such embodiments, the phase selection module may further comprise a delay counter and counter adjustment logic configured to increment and/or decrement the delay counter to thereby adjust the delay applied to the selected phase.

Other embodiments include a system for synchronizing a plurality of serial bitstreams having a common bitrate that are each received at a multi-pin asynchronous interface, the system comprising: a clock generator configured to produce a common clock signal having a frequency substantially equal to an integer multiple of the common bitrate; a plurality of bit synchronization modules each associated with one of the plurality of serial bitstreams configured to receive the common clock signal, each of the plurality of bit synchronization modules comprising: an activity detection module configured to detect bit transitions occurring during each of a plurality of phases of the associated bitstream, each phase corresponding to a cycle of the common clock signal; a phase selection module coupled to the activity detection module and configured to select one of the plurality of phases based upon the bit transitions detected within each of the plurality of phases; and a phase extraction module coupled to the phase selection module, wherein the phase extraction module is configured to extract the selected phase of the associated bitstream to thereby bit synchronize the associated bitstream to the other serial bitstreams; and a word synchronization module configured to receive each of the extracted bitstreams from the plurality of bit synchronization modules and to extract data words from the synchronized bitstreams. In such embodiments one of the plurality of bitstreams may be configured as a framing signal, and the word synchronization module may be configured to extract the data words from the plurality of bitstreams using the framing signal. The system may implement an interface between integrated circuits or other components used as radio frequency transceivers and/or baseband modems, or the any other.

While these and other exemplary embodiments have been presented in the foregoing detailed description, it should be appreciated that a vast number of alternate embodiments and equivalent variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A method for bit synchronizing a plurality of serial bitstreams with a common clock signal having a common clock frequency, the method comprising the steps of:
   oversampling each of the plurality of serial bitstreams at a sampling frequency substantially equal to an integer multiple of the common clock frequency to create a plurality of phases associated with each of the serial bitstreams;

detecting activity occurring within each of the plurality of phases for each of the serial bitstreams, wherein each of the plurality of phases corresponds to a cycle of the common clock signal;

selecting one of the plurality of phases for each of the serial bitstreams based upon the activity detected within the selected phase; and extracting data from the selected phase for each of the serial bitstreams to thereby bit synchronize each of the plurality of serial bitstreams;

wherein the selecting step comprises the step of adjusting a phase select counter by a counter adjustment logic to thereby select a tap associated with the selected phase.

2. The method of claim 1 wherein the detecting step comprises producing an indication signal in response to a bit transition occurring within one of the plurality of phases and subsequently detecting the occurrence of the indication signal during each of the plurality of phases.

3. The method of claim 1 wherein the selecting step comprises determining which of the plurality of phases exhibits the least amount of activity.

4. The method of claim 1 wherein the selecting step comprises determining which of the plurality of phases exhibited bit transitions within a predetermined number of prior bit periods.

5. The method of claim 1 further comprising the step of delaying the extracted data by a delay time determined as a function of the selected phase.

6. The method of claim 5 wherein the selecting step comprises adjusting a delay counter in response to the selected phase, wherein the delay counter is configured to alter the delay time.

7. The method of claim 1 further comprising the step of generating the common clock signal as a function of a bitrate associated with each of the plurality of serial bitstreams.

8. The method of claim 7 wherein the common clock signal is substantially equal to an integer multiple of the bitrate.

9. A device for synchronizing one of a plurality of serial bitstreams to the other bitstreams received in a multi-pin asynchronous interface having a common clock signal, the device comprising:

an activity detection module configured to detect bit transitions occurring during each of a plurality of phases of the bitstream, each phase corresponding to a cycle of the common clock signal;

a phase selection module coupled to the activity detection module and configured to select one of the plurality of phases based upon the bit transitions detected within each of the plurality of phases, the phase selection module comprising a phase select counter and counter adjustment logic configured to increment and/or decrement the phase select counter to thereby select one of the plurality of phases with the phase select counter; and a data extraction module coupled to the phase selection module and comprising a tapped delay line having a plurality of taps each associated with one of the plurality of phases, wherein the data extraction module is configured to extract the selected phase of the bitstream on one of the plurality of taps to thereby bit synchronize the bitstream to the other serial bitstreams.

10. The device of claim 9 wherein the activity detection module comprises a pulse generator configured to generate a pulse in response to a bit transition in the bitstream.

11. The device of claim 9 wherein the activity detection module comprises a delay module and a transition detect circuit for each of the plurality of phases.

12. The device of claim 9 wherein the phase selection module comprises phase selection logic configured to identify the selected phase based upon the number of bit transitions occurring within a predetermined number of prior bit periods.

13. The device of claim 9 further comprising a delay module coupled to receive the selected phase of the bitstream from the phase extraction module and to apply a delay to the selected phase.

14. The device of claim 13 wherein the phase selection module further comprises a delay counter and counter adjustment logic configured to increment and/or decrement the delay counter to thereby adjust the delay applied to the selected phase.

15. A system for synchronizing a plurality of serial bitstreams having a common bitrate that are each received at a multi-pin asynchronous interface, the system comprising:

a clock generator configured to produce a common clock signal having a frequency substantially equal to an integer multiple of the common bitrate;

a plurality of bit synchronization modules each associated with one of the plurality of serial bitstreams configured to receive the common clock signal, each of the plurality of bit synchronization modules comprising:

an activity detection module configured to detect bit transitions occurring during each of a plurality of phases of the associated bitstream, each phase corresponding to an oversampled representation of the phase that is sampled according to a cycle of the common clock signal;

a phase selection module coupled to the activity detection module and configured to select one of the plurality of phases based upon the bit transitions detected within each of the plurality of phases; and a phase extraction module coupled to the phase selection module, wherein the phase extraction module is configured to extract the selected phase of the associated bitstream to thereby bit synchronize the associated bitstream to the other serial bitstreams; and a word synchronization module configured to receive each of the extracted bitstreams from the plurality of bit synchronization modules and to extract data words from the synchronized bitstreams;

wherein the phase selection module comprises a phase select counter and counter adjustment logic configured to increment and/or decrement the phase select counter to thereby select a tap associated with the selected phase.

16. The system of claim 15 wherein one of the plurality of bitstreams is configured as a framing signal, and wherein the word synchronization module is configured to extract the data words from the plurality of bitstreams using the framing signal.

17. The system of claim 15 wherein the system is an interface between a radio frequency transceiver and a baseband transceiver.

18. The system of claim 15 wherein a data extraction module comprises a tapped delay line having a plurality of taps each associated with one of the plurality of phases, wherein the data extraction module is configured to extract the selected phase of the bitstream on one of the plurality of taps.

* * * * *